United States Patent [19]

Dupeyrat et al.

[11] Patent Number: 4,626,649

[45] Date of Patent: Dec. 2, 1986

[54] CONTROL DEVICE FOR THE AUTOMATIC ALIGNMENT OF A LASER BEAM

[75] Inventors: Benoit Dupeyrat, Chilly-Mazarin; Nathalie Mardon, Asnieres; Jean-Paul Noel, Chatenay-Malabry, all of France

[73] Assignee: Commissariat a l'Energie Atomique, Paris, France

[21] Appl. No.: 663,774

[22] Filed: Oct. 23, 1984

[30] Foreign Application Priority Data

Oct. 24, 1983 [FR] France ................. 83 16912

[51] Int. Cl.[4] ............................................. B23K 26/02
[52] U.S. Cl. .................... 219/121 LU; 219/121 LC; 219/121 LG; 250/491.1
[58] Field of Search ..... 219/121 LU, 121 L, 121 LM, 219/121 LV; 250/491.1

[56] References Cited

U.S. PATENT DOCUMENTS

| 4,035,654 | 7/1977 | Elmer | 250/491.1 |
| 4,079,230 | 3/1978 | Miyauchi et al. | 219/121 LU |
| 4,243,888 | 1/1981 | Gruhn et al. | 250/491.1 |

FOREIGN PATENT DOCUMENTS 0057634  8/1982  European Pat. Off. .
2028881 10/1970  France .

Primary Examiner—C. L. Albritton
Attorney, Agent, or Firm—Michael N. Meller

[57] ABSTRACT

A laser beam alignment device which has a movable beam-deflection mirror, two motors for modifying the orientation of the mirror, two incremental coders associated with the motors, a thermoelectric detector placed between the target to be reached by the beam and the deflection mirror and able to supply voltage differences in accordance with the misalignment of the beam and an electronic processing system for controlling the motors as a function of voltage differences and pulses produced by the coders, so as to keep the beam aligned on the target.

4 Claims, 17 Drawing Figures

FIG. 11A
FIG. 11B
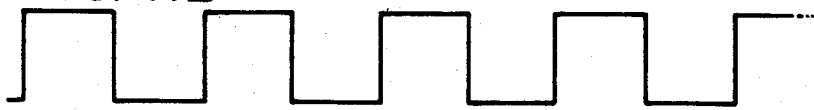
FIG. 11C
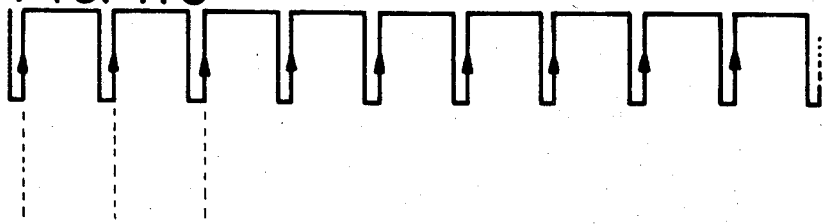
FIG. 11D
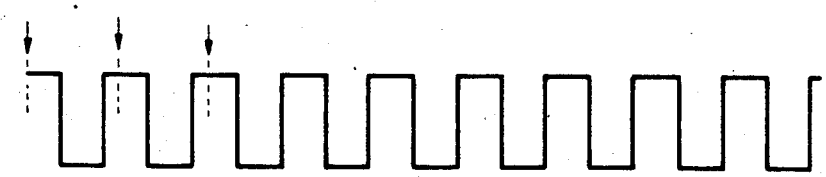
FIG. 11E

CONTROL DEVICE FOR THE AUTOMATIC ALIGNMENT OF A LASER BEAM

BACKGROUND OF THE INVENTION

The present invention relates to a control device for the automatic alignment of a laser beam. It more particularly applies to the field of utilizing the energy of a laser beam, in which the beam must be directed in a preferred direction. The invention more particularly applies to machining by laser, which requires the directing of a beam from a power laser onto the orifice of a nozzle by means of focusing optics.

The laser beams in question are those whose transverse energy distribution substantially has a central symmetry. They are in particular substantially Gaussian laser beams from lasers emitting essentially in accordance with the fundamental mode $TEM_{00}$.

Pyroelectric laser beam positioning of alignment detectors are known. Such detectors suffer from the disadvantage of not being able to readily withstand the high densities of high energy power, which limits their use to relatively low energy laser beams and prevents their use with power lasers.

Other laser beam alignment detectors are known, which can be used with power lasers and for this purpose has thermoelectric detection means fixed to thermally absorbent measuring surfaces acting as black bodies. These other detectors suffer from the disadvantage of having slow response times in proportion to the diffusion of heat in the absorbing surfaces. They also suffer from the disadvantage of having very large measuring surfaces absorbing a larg part of the energy of the incident laser beam, which is highly prejudicial when this beam is continuously used for machining, which requires a high energy density.

SUMMARY OF THE INVENTION

The present invention relates to a control device for the alignment of a laser beam using a thermoelectric alignment detector not suffering from the aforementioned disadvantages. Thus, it can be used with a very high power density laser beam and has very short response times enabling it to detect a fast deflection or deviation of the beam, with a very reduced "shadow effect", i.e. whilst only taking a very small part of the beam energy for detecting the same.

The present invention therefore specifically relates to a control device for the automatic alignment on a target of a laser beam whose transverse energy distribution essentially has a central symmetry comprising:
means for deflecting the laser beam in the direction of the target;
two motors for modifying the deflection of the beam respectively in accordance with two axes perpendicular to one another and to the line joining the target at their intersection, by modifying the orientation of the deflection means;
two incremental coders respectively associated with the motors, each incremental coder being able to produce electrical pulses which are a function of the angle and the rotation direction of the motor with which it is associated;
a thermoelectric detector positioned between the target and the deflection means and able to supply, as a function of the misalignment of the beam along at least one of the axes, a voltage difference substantially proportional to the deflection of the beam along the axis in question; and
an electronic processing system for controlling the motors, as a function of the voltage differences and pulses produced by the incremental coders, so as to keep the beam aligned with the target;
wherein the thermoelectric detector comprises two pairs of thermocouples, whereof the hot junctions are in the laser beam and on a circle, whose plane is perpendicular to the path of the beam, wherein the hot junctions corresponding to one of the pairs belong to one diameter of the circle and wherein the hot junctions corresponding to the other pair belong to another diameter of the circle perpendicular to the said diameter, said diameter and said other diameter being respectively parallel to the axes and meet one another on the said line, the two hot junctions of each pair being at the same temperature when the beam is aligned on the target and coming from the deflection means, so as to obtain the voltage difference relative to an axis between the two hot junctions of the pair of thermocouples corresponding to said axis, and wherein the electronic processing system comprises:
an input-output electronic interface, connected to motors and to the thermocouples and provided with two pulses counters respectively connected to the incremental coders; and
electronic processing means connected to the interface and which, following misalignment of the laser beam, serve to determine on the one hand the state which each counter has to reach for realigning the beam, as a function of the voltage differences, and the state of each counter prior to the misalignment, and on the other hand the voltages to be successively applied to each motor until the realignment is obtained, as a function of the state to be reached by the corresponding counter and the successive states of said counter.

The thermocouples are chosen relative to the temperature range to be measured. For example, they are chromel-alumel thermocouples or tungsten-rhenium thermocouples.

According to a preferred embodiment of the invention, the electronic processing system comprises a low-pass filter for filtering the electrical signals emitted by the thermocouples excited by the laser beam, so as to eliminate therefrom the signals resulting from an instability of the laser system.

Finally, the electronic processing means are preferably provided for carrying out an equalizing of the temperatures measured by the thermocouples by forming the mean of a number of measured temperatures, chosen in such a way that the cut-off frequency of the low-pass filter obtained by the equalization is below the frequency of the instability of the laser system.

BRIEF DESCRIPTION OF THE DRAWINGS

The invention is described in greater detail hereinafter relative to non-limitative embodiments and the attached drawings, wherein show:

FIGS. 11A to 11E timing charts for the signals processed in said other part.

DETAILED DESCRIPTION OF THE PREFERRED EMBODIMENTS

Figure 1:
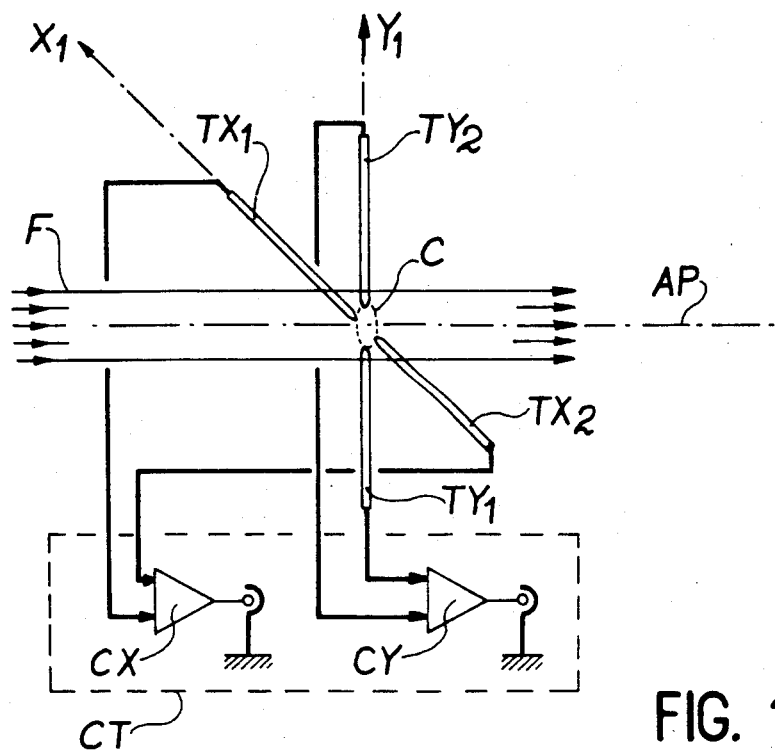
FIG. 1 a diagrammatic view of a special embodiment of the detector used in the invention.

FIG. 1 diagrammatically shows a special embodiment of the detector used in the invention. It comprises a pair of thermocouples $TX_1$ and $TX_2$, whose hot junctions diametrically oppose one another on a circle C within the laser beam F to be investigated and located in a plane perpendicular to the beam. It also comprises another pair of thermocouples $TY_1$ and $TY_2$, whose hot junctions diametrically face one another on circle C, on an axis $X_1$ perpendicular to an axis $Y_1$ joining the hot junctions of thermocouples $TX_1$ and $TX_2$. The thermocouples are mounted on not shown supports.

The thermocouples are also connected to a means CT for analyzing signals emitted by these thermocouples and which is called a centralizer and comprises e.g. a comparator ADX at the inputs of which are supplied the signals from thermocouples $TX_1$ and $TX_2$ and another comparator ADY to whose inputs are supplied the signals from thermocouples $TY_1$ and $TY_2$.

If beam F is correctly centered on the detector, i.e. if its major axis AP passes through the centre of circle C, the thermocouples all measure the same temperature and no signal is observed at the output from these comparators. A deflection of the beam in direction $X_1$ (and/or $Y_1$) leads to a temperature difference between thermocouples $TX_1$ and $TX_2$ (and/or $TY_1$ and $TY_2$) and a signal appears at the output of comparator CX (and/or CY) on the basis of which it is possible to determine the deflection of the beam, as will be seen hereinafter.

For example, the thermocouples are produced with small diameter chromel-alumel wires, e.g. approximately 0.1 mm with a bare head. Such thermocouples can be used in a temperature range between approximately $-270°$ C. and $+1370°$ C. and can be consequently used with a beam from a laser, whose power can reach and even exceed 3 kW.

Figure 2:
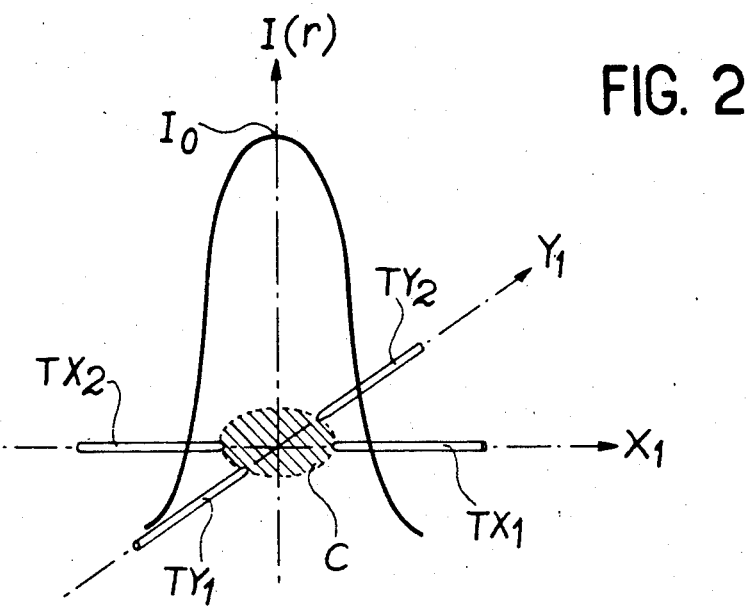
FIG. 2 a graph showing the transverse energy distribution of a Gaussian laser beam.

FIG. 2 is a graph showing the transverse energy distribution of a Gaussian laser beam F. The intensity of the beam F considered in the plane $(X_1, Y_1)$ at a distance r from the intersection of the axes $X_1$ and $Y_1$ can be written:

$$I(r) = I_0 \exp(-2r^2/w_0^2) \quad (1)$$

The quantity $w_o$ being interpreted as the distance at which the maximum intensity $I_o$ is divided by $e^2$ and which preferably corresponds to the radius of circle C.

In view of the fact that the temperature recorded by a thermocouple is proportional to the intensity of the beam received by said thermocouple, if $r_R$ designates the radius of the circle C when the major or central axis of the beam passes through the centre of said circle and if $T_R$ designates the temperature recorded by the thermocouples on circle C, it can be demonstrated that a deflection $\Delta r$ of the major axis of the beam is essentially linked with the temperature variation $\Delta T$ detected between two diametrically opposite thermocouples on the basis of the relation $$\Delta r = K \cdot \Delta T \quad (2)$$

in which K is a constant, such that:

$$K = w_o^2 / (4\, r_R\, T_R)$$

Figure 3:
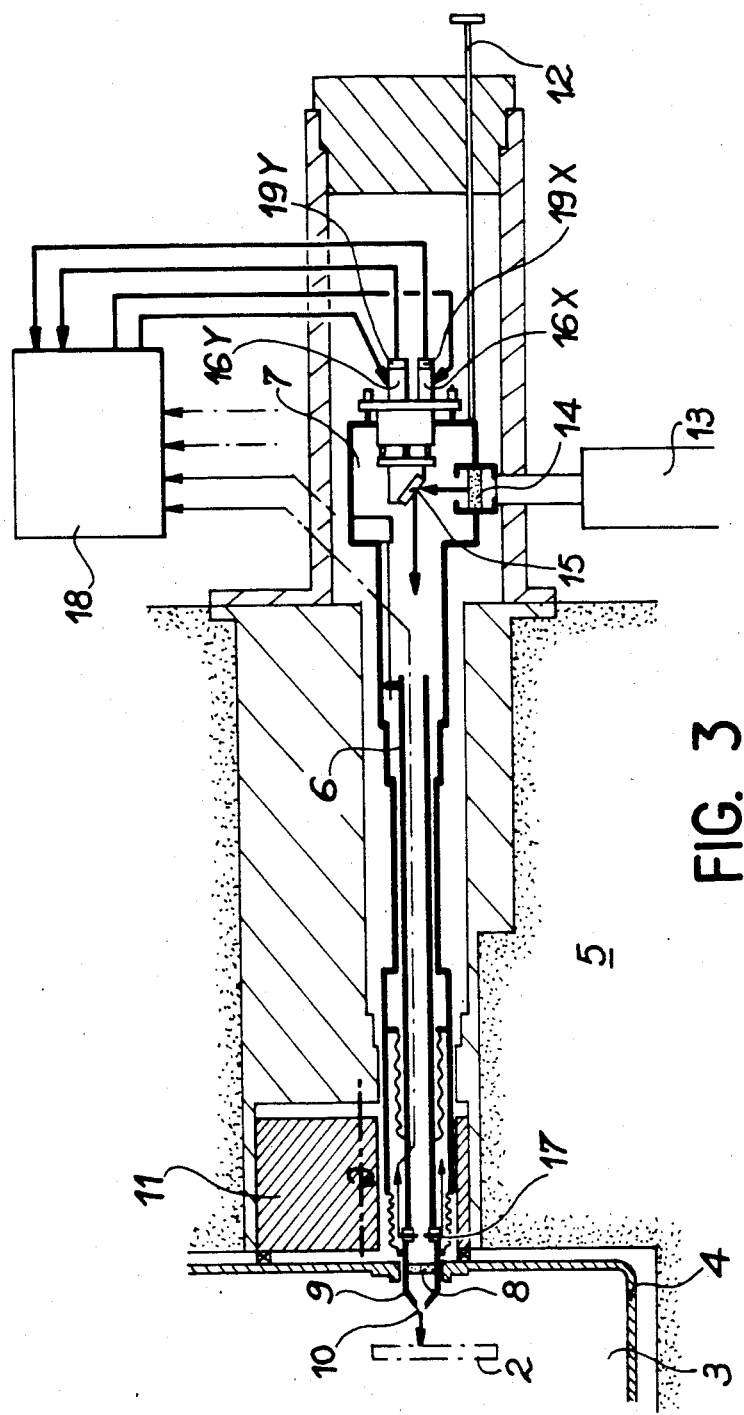
FIG. 3 a diagrammatic view of a special embodiment of the control device according to the invention applied to laser beam machining.

FIG. 3 diagrammatically shows a special embodiment of the control device according to the invention, used for permanently keeping the beam aligned with a target, e.g. in a non-limitative manner in the field of laser beam machining. FIG. 3 shows a power laser beam machining installation of the type described in French Patent Application No. 8101810 of Jan. 30, 1981 and which permits the machining of a part 2 located within an enclosure 3 and which is liable to contain highly radioactive materials and which is defined by a confinement wall 4. A thick concrete wall 5 provides protection against the radiation of the materials contained in enclosure 3.

The installation comprises a tube 6 connected by one end to a chamber 7 and terminated, at its other end, by a machining head provided with a focusing lens 8, followed by a nozzle 9 having an orifice or opening 10. The machining head is able to enter enclosure 3 and can be retracted behind a protective drum 11. A rod 12 permits the translation of chamber 7 and tube 6.

A machining laser 13, outside enclosure 3, is able to emit a beam, which traverses a window 14 and is then deflected by a deviating mirror 15 in chamber 7. It is then propogated in tube 6 and reaches part 2, after passing through the lens 8 and the nozzle orifice 10.

The alignment device according to the invention enables the beam to permanently pass through said orifice without any appreciable deflection because this would damage the nozzle. It essentially comprises the mirror 15 associated with two motors 16X and 16Y for the orientation of the mirror, a detector 17 of the type described with reference to FIG. 1 and an electronic processing system 18. The device also comprises incremental coders 19X and 19Y, respectively associated with motors 16X and 16Y.

The detector is mounted in tube 6 at a limited distance from orifice 10 and in such a way that the axis of tube 6 passes through the orifice and through the centre of the circle on which are located the hot junctions of the thermocouples. For example, the detector is fitted in the vicinity of lens 8, between the latter and mirror 15. The latter is inclined by 45° with respect to the axis of tube 6, when the beam is correctly regulated in order to reach the orifice 10 during propagation along the axis of tube 6.

The electronic processing system 18 is connected to the thermocouples of detector 17, to motors 16X, 16Y and to coders 19X, 19Y.

Figure 4:
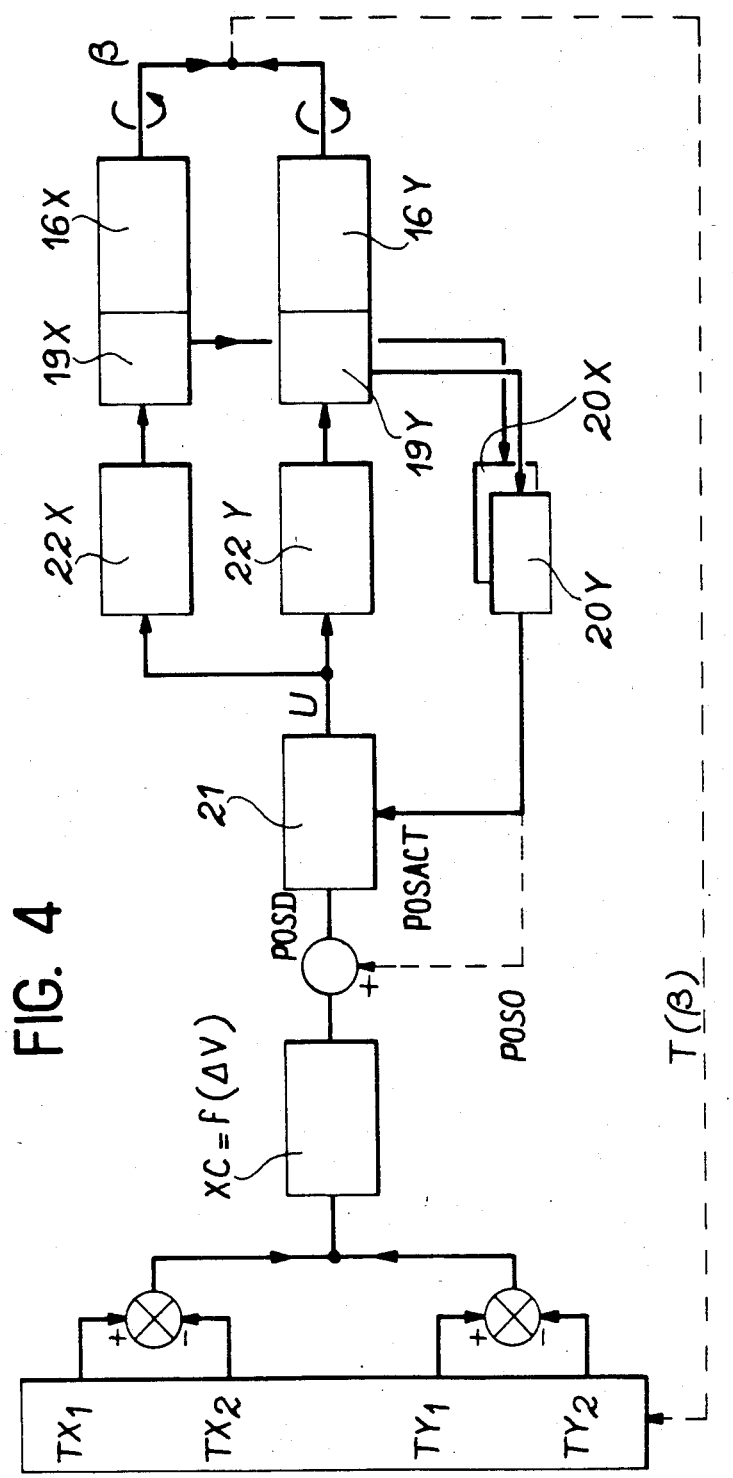
FIG. 4 a diagram of the control obtained by said device.

FIG. 4 is a diagram of the control brought about by the device according to the invention and shown in FIG. 3. Motors 16X, 16Y make it possible to modify the deflection of the beam along two axes X and Y perpendicular to the axis of tube 6 and which intersects thereon and respectively parallel to axes $X_1$ and $Y_1$. In order to permit a better understanding of FIG. 4, all that is completely shown is the control relative to axis Y, motor 16Y and thermocouples $TY_1$ and $TY_2$.

The incremental coders 19X and 19Y are respectively connected to counters 20X and 20Y, which are themselves connected to electronic processing means 21 forming part of system 18. These counters record pulses produced by the coders, each revolution of a motor corresponding to a given number of pulses.

On considering the example of the control corresponding to the misalignment of the beam along axis X, the device seeks to cancel out the voltage difference $\Delta V$ appearing as a result of the misalignment between thermocouples $TY_1$ and $TY_2$. Processing means 21 determine the number XC of pulses (which is a function f of $\Delta V$) to be counted by counter 20Y for it to pass from its precontrol state POSO to its final state POSD following the realignment of the beam and also determine the voltages U to be successively applied to motor 16Y via a power amplifier 22Y (having a homolog 22X associated with motor 16X) until the realignment is obtained, as a function of state POSD and the successive states POSACT of counter 20Y during the control. Thus, it is possible to write:

$$U = A\,(POSD - POSACT)$$

in which A designates the proportional gain which can be taken as equal to 2.

Figure 5:
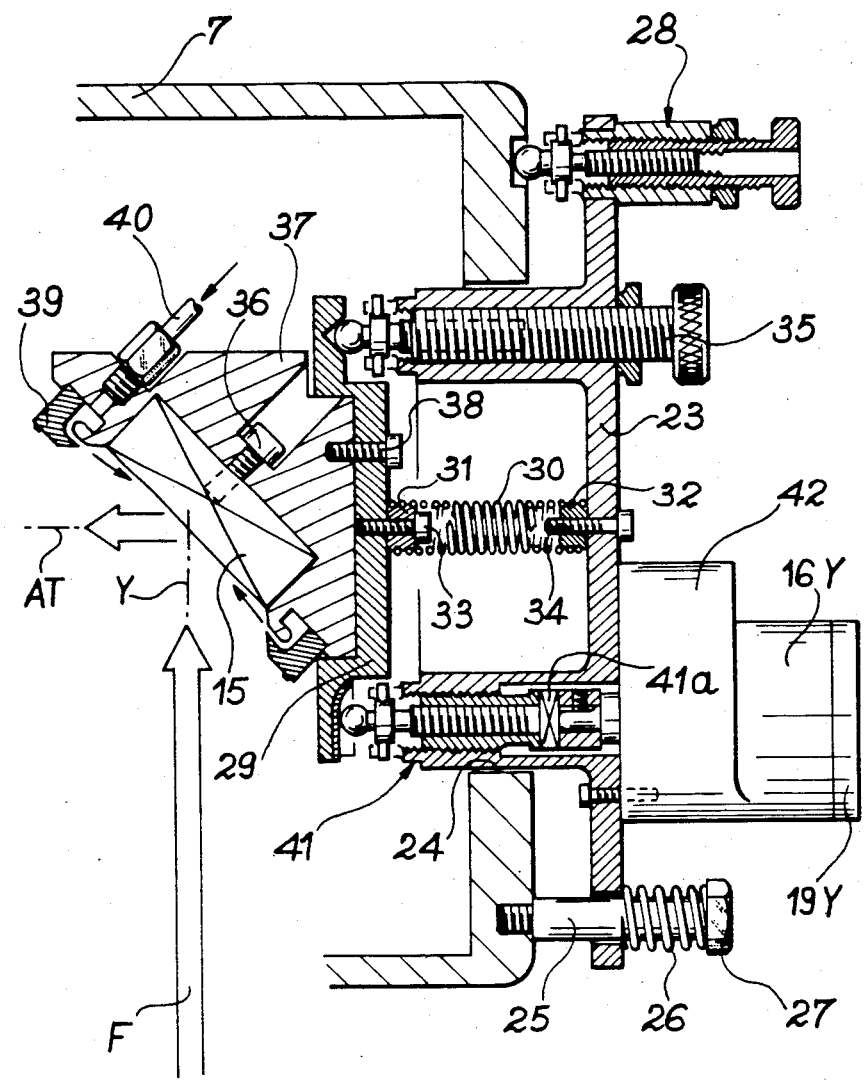
FIG. 5 a diagrammatic sectional view of an arrangement of a mirror used in the device shown in FIG. 3.
Figure 6:
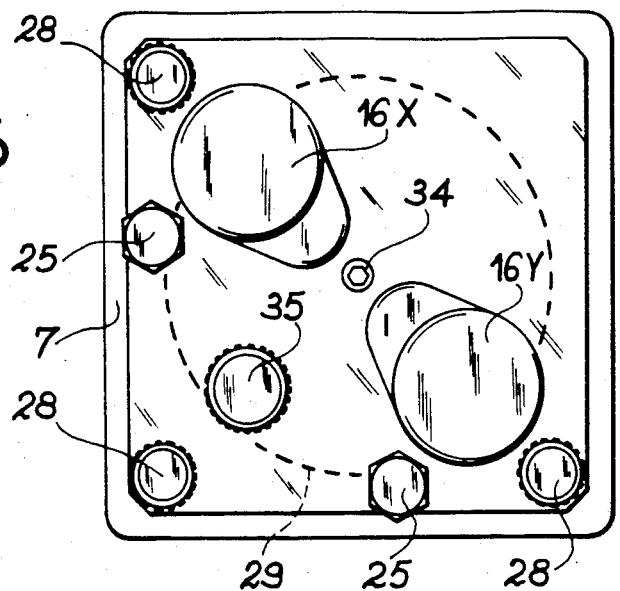
FIG. 6 a diagrammatic view of the arrangement.

FIG. 5 is a diagrammatic sectional view of the arrangement of the mirror 15 in chamber 7 (which is obviously perforated for the entry of beam F). In FIG. 5, it has been assumed that the axis AT of tube 6 is horizontal. Beam F enters chamber 7 vertically through the bottom thereof and is reflected along axis AT onto mirror 15 inclined by 45° relative to axis AT. The arrangement comprises a table 23 outside chamber 7 and whereof one end enters the latter through an opening 24 of axis AT made in said chamber 7. Table 23 is kept on chamber 7 by two screws 25 (FIGS. 5 and 6) traversing table 23 and screwed into the chamber, springs 26 being placed between the heads 27 of screws 25 and table 23. Three differential screws 28 (FIGS. 5 and 6), which can rotate and translate relative to table 23 and bear on chamber 7, permit a displacement of the table relative to chamber 7.

The arrangement also comprises a plate 29 located in chamber 7 and fixed to table 23 via a spring 30, whose ends are integral with washers 31, 32, which are respectively fixed to the plate and the table by screws 33, 34. A differential screw 35, which can rotate and translate relative to the table and bears on the plate, permits a manual orientation of the plate relative to chamber 7. Mirror 15 fixed by a screw 36 to a support block 37, which is itself fixed to plate 29 by screws 38. Mirror 15 is also air-cooled by means of a circular nozzle 39 located on the periphery of the mirror and supplied by an air intake pipe 40. Two other differential screws 41 can rotate and translate relative to the table and bear on plate 29. They are respectively displaced by motors 16X and 16Y, which are integral with the table via reduction gears 42 and are positioned in such a way as to respectively permit the deflections of the beam along axes X (horizontal) and Y (vertical). The travel of the differential screws 41 is limited by means of an end of travel abutment by a microswitch 41a producing a signal which stops the motor and optionally the laser.

In an informative and non-limitative manner the pitch of screws 41 is 0.02 mm; the motors are direct current motors marketed by the ESCAP company under reference 34L12-219P; the reduction gears have a ratio 1/135; the coders are optical coders with 192 lines and two channels giving output signals phase-displaced by $\pi/2$, in such a way as to give information on the rotation direction of the motors.

Figure 7:
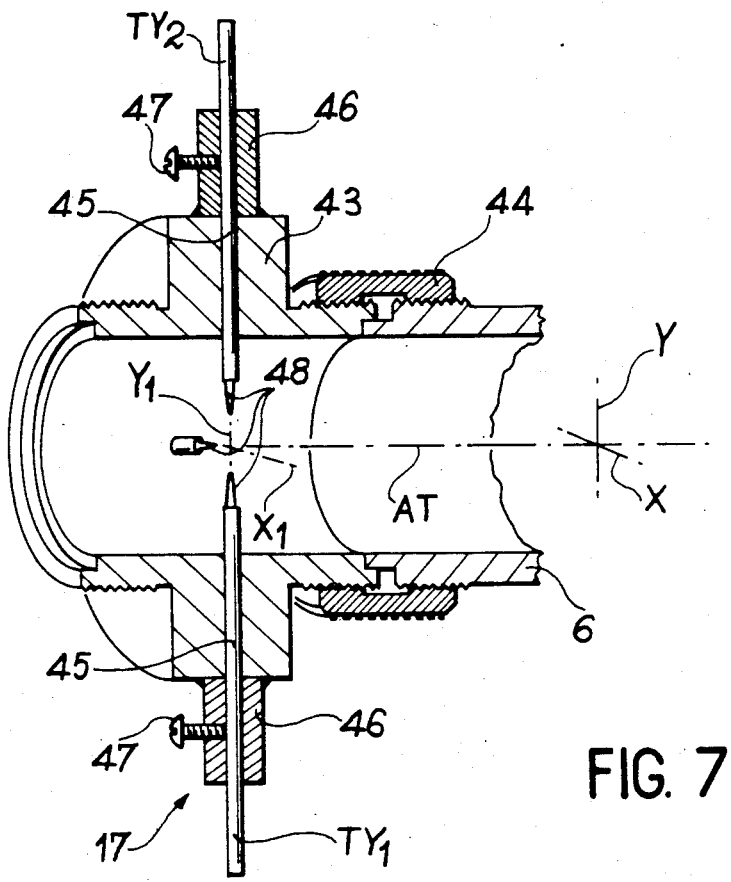
FIG. 7 a view of a support for the thermocouples used in this device.

FIG. 7 diagrammatically shows the arrangement of detectors 17 on tube 6. It is placed between the latter and the machining head and comprises a tubular coupling 43 assembled with tube 6 by means of a female ring 44 (assembly to the machining head taking place in an identical, not shown manner). Four coplanar radial holes 45, at 90° from one another, pass through the coupling 43 and are extended by sleeves 46. The thermocouples, provided with supporting and protecting sheaths, are "threaded" by these sleeves and holes and are kept in position by locking screws 47, the four hot junctions 48 being cocyclic, as was shown hereinbefore. Moreover, the thermocouples have a "bare head", i.e. they are bared over a maximum length and positioned in such a way that the hot junctions are as near as possible to the axis of tube 6, so as to obtain signals usable for a low power beam, whilst remaining within temperature ranges which can be withstood if the beam is a high power beam.

Reference will now again be made to quantity XC referred to hereinbefore and which is obviously positive or negative as a function of the considered motor rotation. This quantity is proportional to the forward or return movements $\Delta$ screw to be imposed on the corresponding differential screw 41. Bearing in mind the fact that a vertical deflection (according to Y) of the beam by an angle $\beta$ is compensated by a rotation of mirror 15 by an angle $\beta/2$ and that a horizontal deflection (according to X) of the beam by an angle $\beta$ is compensated by a rotation of mirror 15 by an angle $\beta$, it can be deduced that $\Delta$ screw is proportional to $\Delta r/2$ in the case of a vertical deflection $\Delta r$ and to $\Delta r$ in the case of a horizontal deflection $\Delta r$ with the same proportionality constant. Thus, the quantity XC can be linked with quantity $\Delta T$ of formula (2) considered hereinbefore and consequently with the quantity $\Delta V$ proportional to $\Delta T$.

The coefficient K of formula (2) is determined at the start of use of the laser beam with automatic alignment, on the basis of a determination for each axis X or Y, by deflecting the beam by a value $\Delta r$ (according to X or Y), by determining the variation $\Delta T$ corresponding thereto and by calculating the ratio $\Delta r/\Delta T$, equal to K according to formula (2).

Figure 8:
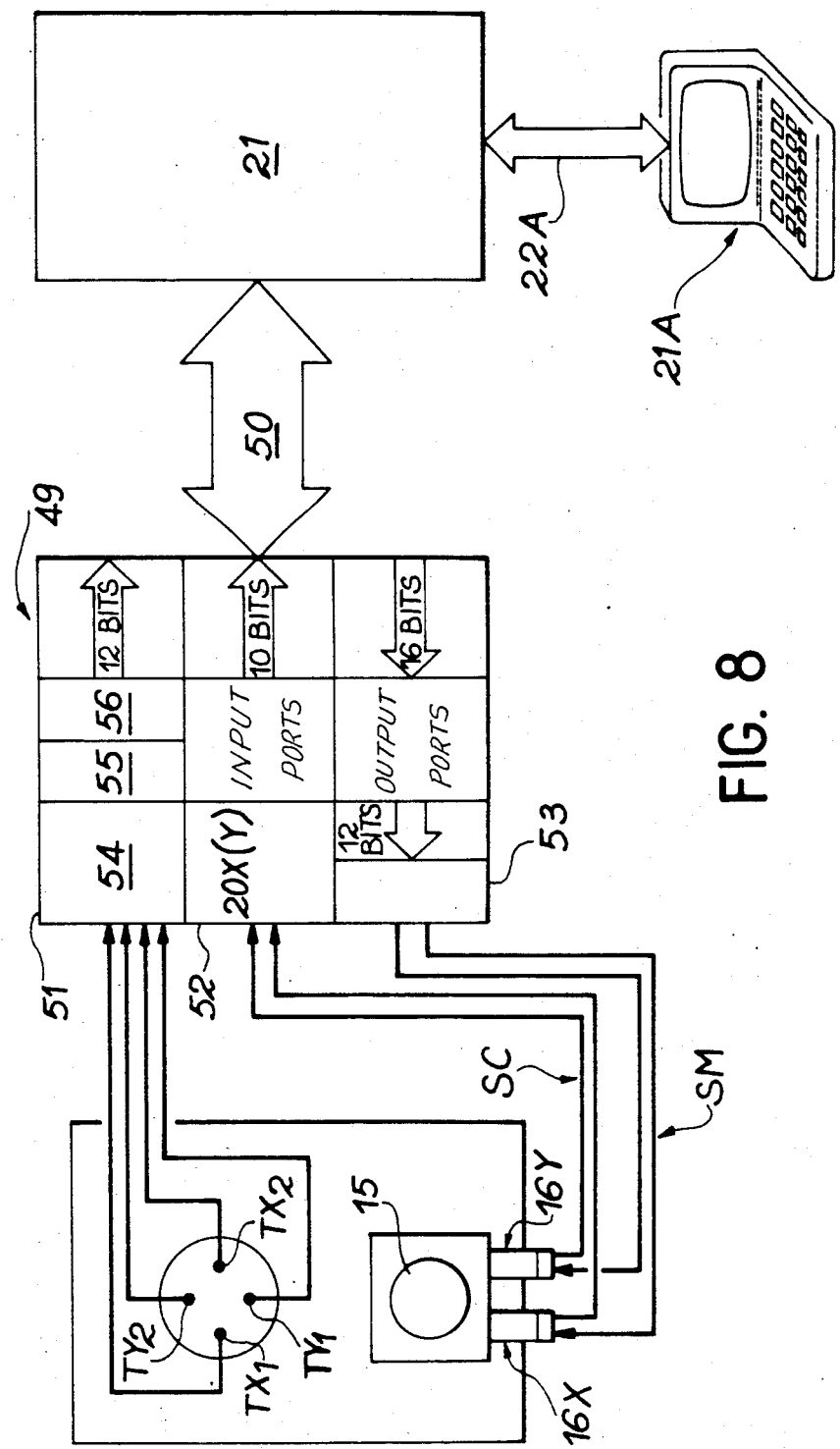
FIG. 8 a diagrammatic view of an electronic processing system usable with the device FIG. 9 a diagrammatic view of a part of this system corresponding to the input of the signals from the thermocouples used with the device.

FIG. 8 diagrammatically shows a special embodiment of the electronic processing system forming part of the device according to the invention shown in FIG. 3. It comprises an electronic input - output interface 49 and electronic processing means 21. The latter are constituted by a processor, e.g. a microprocessor of INTEL type 8086, with which is associated a digital processor of INTEL type 8087, permitting floating point processing. The assembly is placed on a microprocessor card of INTEL type SCB 8614, which has 32 RAM kbytes (which can be extended to 64 kbytes) and 32 PROM kbytes and which is entirely compatible with the MUL- TIBUS standard supporting 16 bit data transfers and permits the use of INTEL 8 or 16 bit SBC extension cards. Moreover, the INTEL processor 8086 is a 1 megabyte-addressable microprocessor.

The input-output interface 49 connects the motors, thermocouples and incremental coders to card SBC 8614. It is placed on an INTEL SBC 905 card, connected to card SBC 8614 by a 16 bit databus 50, in accordance with the MULTIBUS standard.

Interface 49 essentially comprises means 51 for the processing of the voltages of the thermocouples, means 52 for processing the pulses SC from the incremental coders and means 53 for processing the motor control signals from the processing means 21, whereby once the motor control signals SM have been processed, they are supplied to the motors. FIG. 8 also shows a control console 21 connected to SBC 8614 card by a 22A bus of e.g. INTEL type Rs 232.

Figure 9:
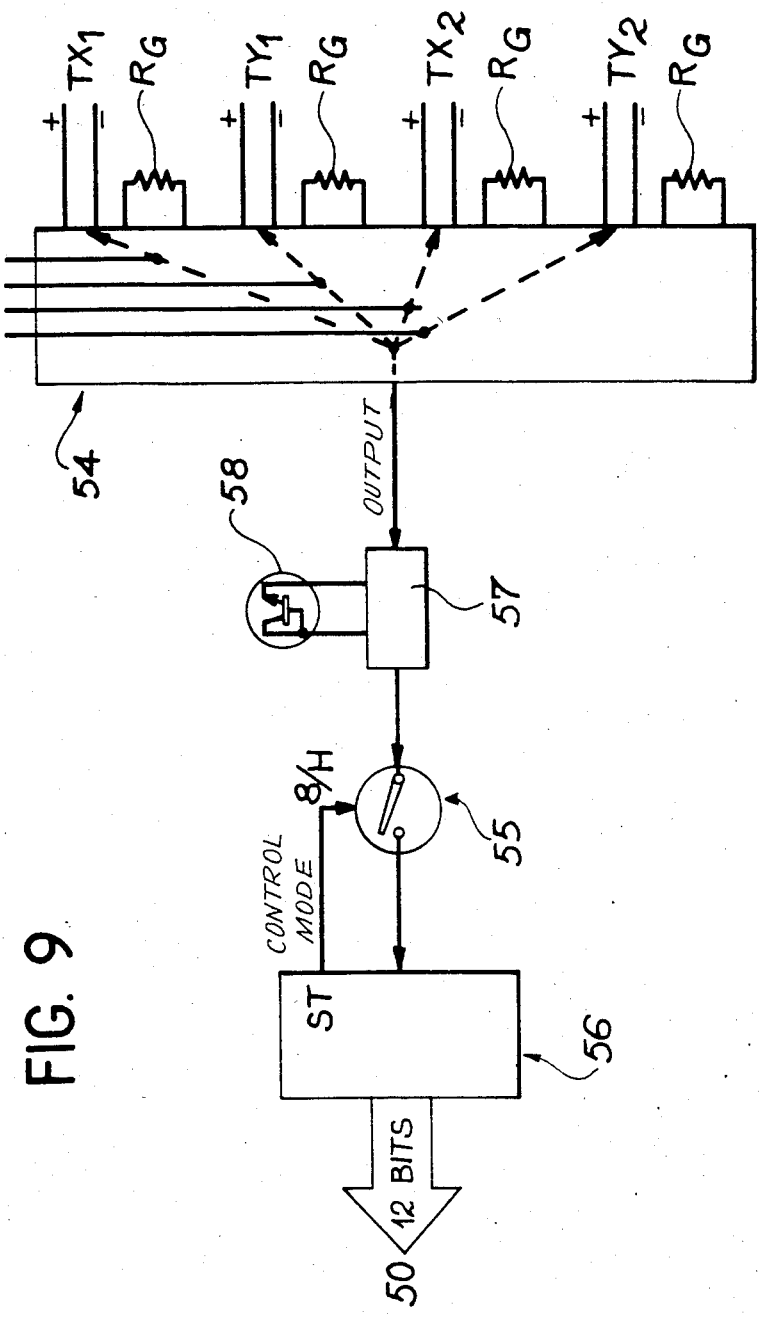

The means 51 for processing the voltages of the thermocouples essentially comprise (FIGS. 8 and 9) conditioning means 54 by amplification, filtering and multiplexing, followed by a sample and hold circuit 55, which is itself followed by an analog - digital converter 56. More specifically, the voltages supplied by the four thermocouples are at low level (approximately 0 to 50 mV) and are supplied to a circuit 54, e.g. of type 2B54 of the analog devices company, which amplifies them up to ±5 V and has four resistors $R_G$ respectively associated with the four thermocouples and adjustable in order to ensure the gain G, such that:

$$G = 10^4/R_G + 1$$

in which $R_G$ is expressed in $\Omega$.

In the case of chromel-alumel thermocouples, a value of 111$\Omega$ is suitable for $R_G$. Each amplifier chain is electrically insulated from the three others and is associated with a 50 Hz signal filter. The channels corresponding respectively to the four thermocouples are then multiplexed towards an output buffer memory (still in circuit 54). In order that the processed voltage relates to a true temperature with respect to 0° C. and which is independent of ambient temperature variations, following multiplexing, the thermocouple signals are supplied to a cold junction compensator 57, e.g. of type 2B56 of the analog devices company, which is equipped with a heat sensor 58, e.g. constituted by a 2N2222 transistor. The cold junction voltage is amplified in the same proportions as the voltages of the thermocouples.

The analog signal from compensator 57, which is the sum of the measuring voltages of the thermocouples and the cold junction voltage, is then digitized by the 12 bit analog-digital converter 56, e.g. of analog devices type AD574. During the reading of the analog voltage, it is appropriate to lock the same by the sample and hold circuit 55, e.g. of BURRBROWN type SHC 298. The "status on" signal (ST) of converter 56 indicates the state thereof and serves as a control mode for the sample and hold circuit. The 12 output bits of converter 56 are directly supplied to bus 50 and give coded information on the temperatures recorded by the thermocouples.

Figure 10:
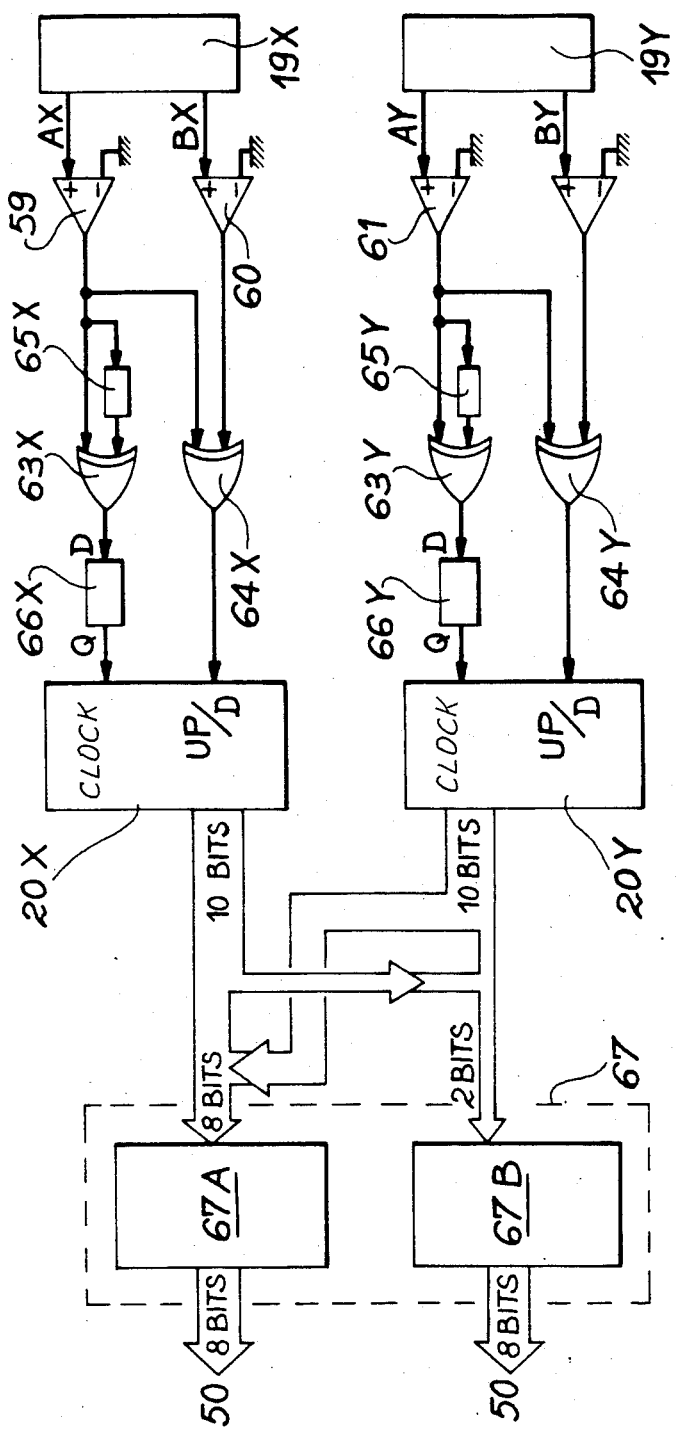
FIG. 10 a diagrammatic view of another part of the system corresponding to the input of the pulses from the incremental coders used with the device.

The means 52 for processing signals from the coders essentially comprise counters 20X and 20Y (FIG. 10). More specifically, the pulses supplied by each channel AX or BX (or AY or BY) of each coder 19X (or 19Y) are sinusoids, which are not symmetrical with respect to zero. They are shaped by an amplifier 59 or 60 (or 61 or 62) of the differential type, e.g. of type SN55115. This operation is carried out close to the optical coders. The signals reaching the interface card 49 are consequently square-wave signals displaced by $\pi/2$ relative to one another. The pulses corresponding to a coder 19X or 19Y shaped in this way are counted by a 10 bit counter 20X or 20Y, e.g. of type LS 491, which trips on the rising fronts.

For a greater accuracy, the frequency of the pulses is doubled and a negative pulse is produced on each of the pulse fronts. It is this signal which is counted. More specifically, the shaped signal of channel AX (or AY) is supplied to an input of two logic exclusive-OR circuits (XOR), designated 63X, 64X (or 63Y, 64Y) and to the other input of circuit 63X (or 63Y) by means of a delay and reversing circuit 665X (or 65Y), whilst the shaped signal of channel BX (or BY) is supplied to the other input of circuit 64X (or 64Y).

Moreover, the output of signal 63X (or 63Y) is connected to the input (clock) of counter 20X (or 20Y) via a flip-flop 66X (or 66Y), whilst the output of circuit 64X (or 64Y) is connected to the UP/D input (add/subtract count) of counter 20X (or 20Y). Each flip-flop makes it possible to read the state of the corresponding counter during a change of state, said flip-flop retaining the pulse during reading. The 10 output bits of counter 20X (or 20Y) are transferred in parallel to bus 50 by a data driver 67 (realised with the aid of two data drivers 67A, 67B of INTEL type 8283 which each accept a maximum of 8 bits).

The displacement of $\pi/2$ between the two signals from an optical coder gives information on the rotation direction of the associated motor and determines the operation of the corresponding counter as an add or subtract counter.

In an explanatory manner, FIGS. 11A to 11E are timing charts of the electric signals produced by certain electronic elements of the diagram of FIG. 10: FIG. 11A shows the signal from amplifier 59 or 61 (channel AX or AY); FIG. 11B shows the preceding signal delayed; FIG. 11C shows the signal present at the output of XOR circuits 63X or 63Y; FIG. 11D shows the signal from amplifier 60 or 62 (channel BX or BY); and FIG. 11E shows the signal from XOR circuits 64X or 64Y. FIG. 11C reveals the frequency doubling referred to hereinbefore and FIG. 11E reveals the possibility of obtaining information on the rotation direction of the motors. The vertical dots indicate the times at which the counters count.

Figure 12:
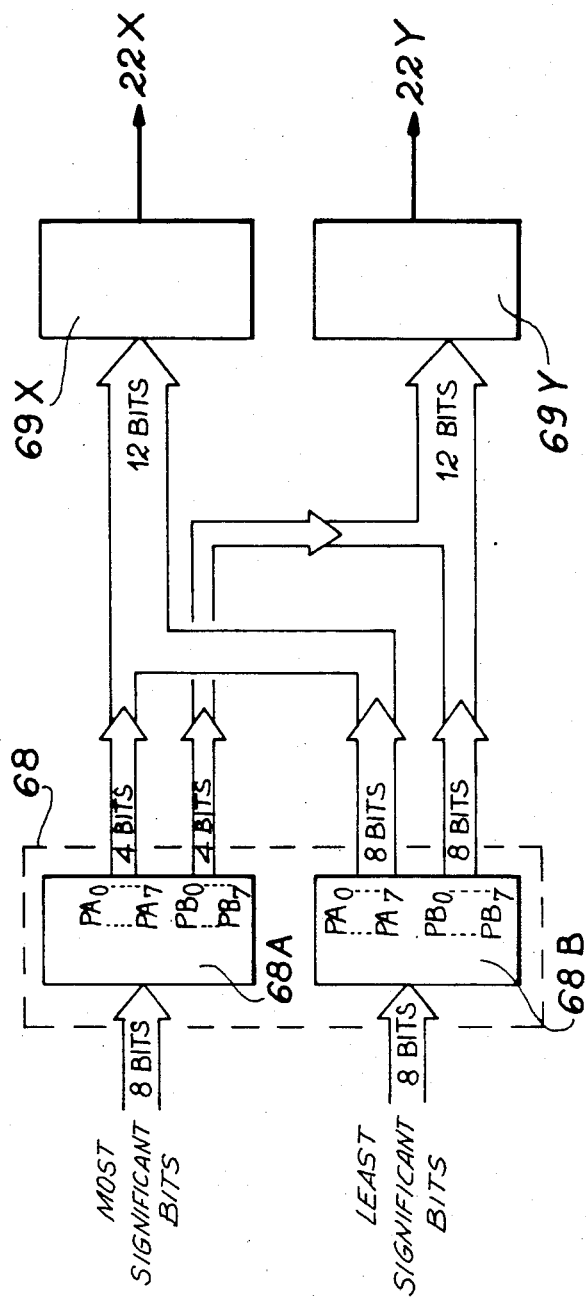
FIG. 12 a diagrammatic view of an output interface of the signals from the electronic processing means belonging to said system.

Following processing by processing means 21, the control voltages of the motors have been supplied on 16 bits from bus 50 and transferred in parallel to interface 49 by a programmable interface 60 (FIG. 12), obtained with the aid of two programmable interfaces of INTEL type PP18255 programmed in the output mode 0, designated 68A and 68B in FIG. 12. The control signals of motor 16X leave by port $PA_0 \ldots PA_7$ of the programmable interface, whilst the control signals of motor 16Y leave by port $PB_0 \ldots PB_7$. The means 53 for processing the control signals from motor 16X or 16Y essentially comprise a 12 bit digital-analog converter 69X or 69Y of type DAC 80, which converts the corresponding digital voltages. Power amplifiers 22A, 22Y installed outside interface 49 close to motors 16Y and 16X bring the analog voltages obtained to the correct level.

Timing is carried out on the interface 49 by not shown, known means. A 30 Hz clock controls the sampling. The timing frequency of INTEL microprocessor 8086 is 5 MHz. It is firstly divided by 4 by a binary counter and then controls an INTEL type 8253 timing unit of interface card 49 which, by programming, produces 30 Hz pulses. The output of the timing unit is read on the bus across an available bit of the driver. The leading front of the 30 Hz pulses is detected by the timing unit programme.

With respect to the connections with bus 50, they are produced on interface 49, in a known manner. The addresses on bus 50 are decoded by an INTEL type 5205 reversing coder. A timing on the good transmission signal $\overline{XACK}$ is necessary in order to enable the system to acquire the data. Timing is carried out by means of a delay circuit.

Figure 13:
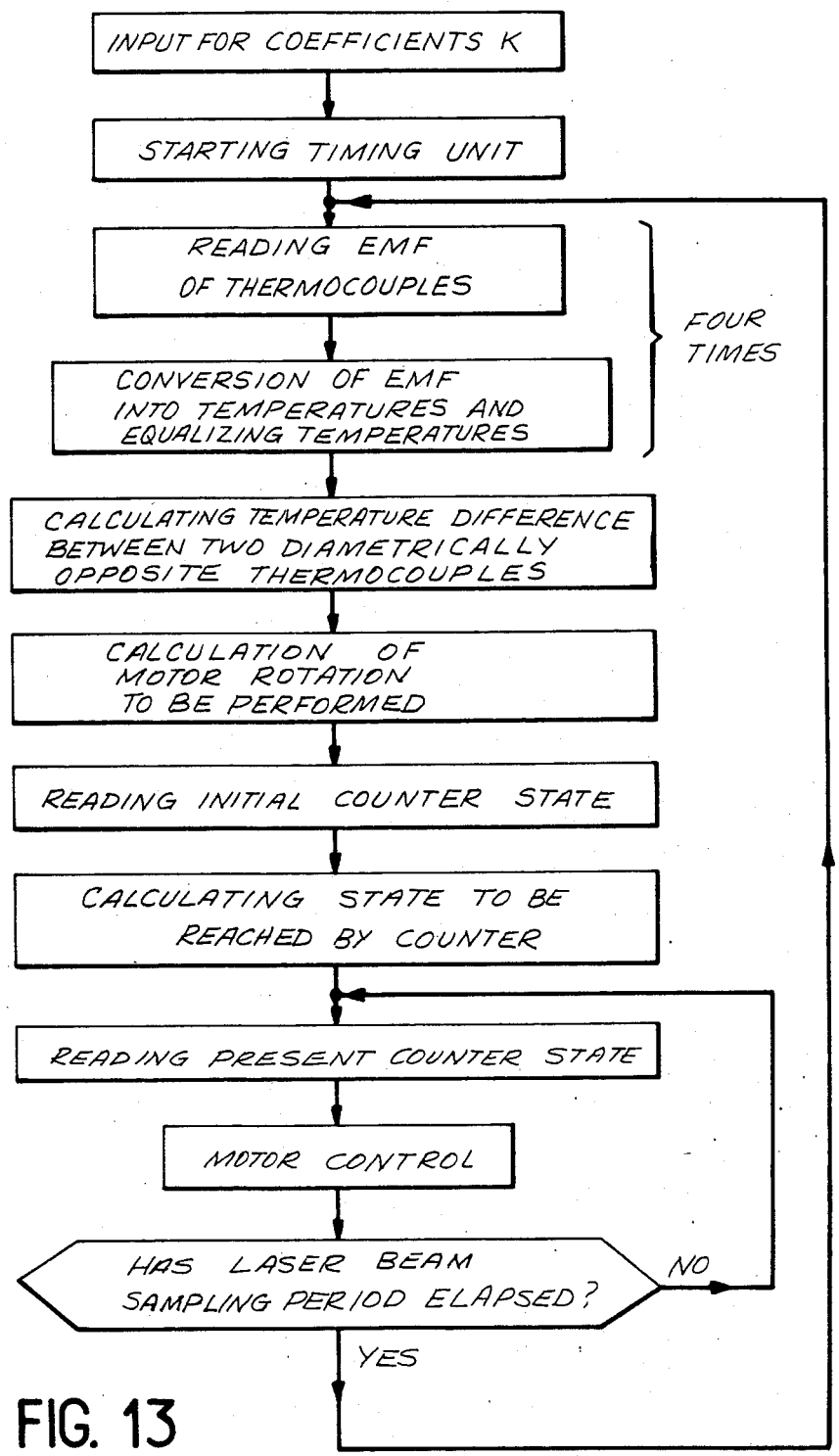
FIG. 13 a general flow chart of a control programme performable by the electronic processing means.

FIG. 13 shows the general control flow chart. The software is written in INTEL language PLM 86 for systems based on microprocessors of type 8086.

The different successive stages of the control programme are as follows: coefficients K are entered; the timing unit is started; the electromotive forces (emf) of the thermocouples are read and then converted into temperatures and the temperatures are equalized (said successive stages of reading the emf, converting the emf into temperatures and equalizing the same are carried out four times, at a rate of once per thermocouple). Then, the temperature difference between two diametrically opposite thermocouples is calculated; the rotation to be affected by the corresponding motor is calculated; the initial state (POSO) of the corresponding counter is read; the state (POSD) to be reached by the counter is calculated; the present state of the counter (POSACT) is read; the motor is controlled; and finally if the sampling period (e.g. 30 ms) of the laser beam (temperature acquisition) has elapsed, there is connection to the start of the emf reading stage of the thermocouples, if not, there is connection to the reading stage of the actual state of the counter.

In order to extract from the overall signal supplied by each thermocouple, the slow variation signal relative to a direction deflection of the beam and to eliminate therefrom the faster fluctuation signal relative to the instability of the laser beam, filtering takes place by smoothing or equalizing the temperature values measured by the thermocouples and this takes place over a large number of values, e.g. 128. Equalizing takes place by storing the temperatures, e.g. in a cyclic pile or stack, with a pointer for indicating the top of the stack, followed by the calculation of the mean value of the thus stored temperatures.

Obviously, one stack per thermocouple is used. Moreover, during initialization, i.e. during the start of control, all the elements of the same stack contain the same value (the sole value read by the corresponding thermocouple).

What is claimed is:

1. A control device for the automatic alignment on a target of a laser beam whose transverse energy distribution essentially has a central symmetry comprising:

means for deflecting the laser beam in the direction of the target;

two motors for modifying the deflection of the beam respectively in accordance with two axes perpendicular to one another and to the line joining the target at their intersection, by modifying the orientation of the reflection means;

two incremental coders respectively associated with the motors, each incremental coder being able to produce electrical pulses which are a function of the angle and the rotation direction of the motor with which it is associated;

a thermoelectric detector positioned between the target and the deflection means and able to supply, as a function of the misalignment of the beam along at least one of the axes, a voltage difference substantially proportional to the deflection of the beam along the axis in question; and an electronic processing system for controlling the motors, as a function of the voltage differences and pulses produced by the incremental coders, so as to keep the beam aligned with the target;

wherein the thermoelectric detector comprises two pairs of thermocouples, whereof the hot junctions are in the laser beam and on a circle, whose plane is perpendicular to the path of the beam, wherein the hot junctions corresponding to one of the pairs belong to one diameter of the circle and wherein the hot junctions corresponding to the other pair belong to another diameter of the circle perpendicular to the said diameter, said diameter and said other diameter being respectively parallel to the axes and meet one another on the said line, the two hot junctions of each pair being at the same temperature when the beam is aligned with the target and coming from the deflection means, so as to obtain the voltage difference relative to an axis between the two hot junctions of the pair of thermocouples corresponding to said axis, and wherein the electronic processing system comprises:

an input-output electronic interface, connected to motors and to the thermocouples and provided with two pulses counters respectively connected to the incremental coders; and electronic processing means connected to the interface and which, following misalignment of the laser beam, serve to determine on the one hand the state which each counter has to reach for realigning the beam, as a function of the voltage differences, and the state of each counter prior to the misalignment, and on the other hand the voltages to be successively applied to each motor until the realignment is obtained, as a function of the state to be reached by the corresponding counter and the successive states of said counter.

2. A device according to claim 1, wherein the electronic processing system comprises a low-pass filter for filtering the electrical signals emitted by the thermocouples excited by the laser beam, so as to eliminate therefrom the signals resulting from an instability of the laser system.

3. A device according to claim, wherein the electronic processing means are preferably provided for carrying out an equalizing of the temperatures measured by the thermocouples by forming the mean of a number of measured temperatures, chosen in such a way that the cut-off frequency of the low-pass filter obtained by the equalization is below the frequency of the instability of the laser system.

4. A device according to claim 2, wherein the electronic processing means are preferably provided for carrying out an equalizing of the temperatures measured by the thermocouples by forming the mean of a number of measured temperatures, chosen in such a way that the cut-off frequency of the low-pass filter obtained by the equalization is below the frequency of the instability of the laser system.

* * * * *